US007962396B1

(12) United States Patent
Calil et al.

(10) Patent No.: US 7,962,396 B1
(45) Date of Patent: Jun. 14, 2011

(54) SYSTEM AND METHOD FOR MANAGING RISK

(75) Inventors: Cassio Calil, New York, NY (US); Guy Coughlan, Surrey (GB); David Epstein, London (GB)

(73) Assignee: JPMorgan Chase Bank, N.A., New York, NY (US)

( * ) Notice: Subject to any disclaimer, the term of this patent is extended or adjusted under 35 U.S.C. 154(b) by 1281 days.

(21) Appl. No.: 11/347,760

(22) Filed: Feb. 3, 2006

(51) Int. Cl.
*G06Q 40/00* (2006.01)

(52) U.S. Cl. ..................................... 705/36 R

(58) Field of Classification Search .............. 705/36
See application file for complete search history.

(56) References Cited

U.S. PATENT DOCUMENTS

| | | |
|---|---|---|
| 3,634,669 A | 1/1971 | Wyckoff et al. |
| 4,338,587 A | 7/1982 | Chiappetti |
| 4,346,442 A | 8/1982 | Musmanno |
| 4,355,372 A | 10/1982 | Goldberg et al. |
| 4,376,978 A | 3/1983 | Musmanno |
| 4,597,046 A | 6/1986 | Musmanno et al. |
| 4,598,367 A | 7/1986 | DeFrancesco et al. |
| 4,642,768 A | 2/1987 | Roberts |
| 4,674,042 A | 6/1987 | Hernandez et al. |
| 4,674,044 A | 6/1987 | Kalmus et al. |
| 4,736,294 A | 4/1988 | Le Grand et al. |
| 4,739,478 A | 4/1988 | Roberts et al. |
| 4,760,604 A | 7/1988 | Cooper |
| 4,774,663 A | 9/1988 | Musmanno et al. |
| 4,831,526 A | 5/1989 | Luchs |
| 4,859,187 A | 8/1989 | Peterson |
| 4,859,837 A | 8/1989 | Halpern |
| 4,866,634 A | 9/1989 | Reboh |
| 4,897,811 A | 1/1990 | Scofield |
| 4,903,201 A | 2/1990 | Wagner |

(Continued)

FOREIGN PATENT DOCUMENTS

EP          0597316          5/1994

(Continued)

OTHER PUBLICATIONS

"A financial model of foreign exchange exposure" Christine R Hekman. Journal of International Business Studies (pre-1986). Atlanta: Summer 1985. vol. 16, Iss. 000002; p. 83, 17 pgs.*

(Continued)

*Primary Examiner* — James A Kramer
*Assistant Examiner* — Jessica L Lemieux
(74) *Attorney, Agent, or Firm* — Lowenstein Sandler PC

(57) ABSTRACT

Embodiments of the invention are directed to systems and methods for managing financial market risk. The method can include defining an exposure map for the treasury budget, calculating and categorizing the financial market risk to the budget, and producing a financial market risk analysis report. The method can also include defining and implementing a hedge to mitigate financial market risks and costs. The hedge can be a basket hedge. The method can also include identifying the financial market risk factors impacting on each element of the budget, generating scenarios for market rates, and producing a report after hedging. Evaluating the financial market risk to the budget under stress scenarios can also be included. Defining the exposure map for the treasury budget can include defining exposures related to revenues and costs (gross profit), interest income, interest expense, hedge cash flow, inter-company cash flow, foreign exchange translation gain or loss, foreign exchange transaction gain/loss, earnings translation gain or loss, and/or commodity inventory gain/loss.

16 Claims, 15 Drawing Sheets

Budget-at-Risk = Expected Budget - Worst Case Budget, as Measured at a 95% Confidence Level

U.S. PATENT DOCUMENTS

| | | |
|---|---|---|
| 4,972,504 A | 11/1990 | Daniel, Jr. |
| 5,041,972 A | 8/1991 | Frost |
| 5,093,907 A | 3/1992 | Hwong et al. |
| 5,220,500 A | 6/1993 | Baird |
| 5,227,874 A | 7/1993 | Von Kohorn |
| 5,231,571 A | 7/1993 | D'Agostino |
| 5,245,535 A | 9/1993 | Weiss et al. |
| 5,278,751 A | 1/1994 | Adiano |
| 5,297,032 A | 3/1994 | Trojan et al. |
| 5,321,933 A | 6/1994 | Seifert et al. |
| 5,351,187 A | 9/1994 | Hassett |
| 5,381,470 A | 1/1995 | Cambray et al. |
| 5,396,621 A | 3/1995 | MacGregor et al. |
| 5,444,844 A | 8/1995 | Inoue |
| 5,481,647 A | 1/1996 | Brody |
| 5,490,060 A | 2/1996 | Malec |
| 5,502,805 A | 3/1996 | Anderson et al. |
| 5,523,942 A | 6/1996 | Tyler |
| 5,550,734 A | 8/1996 | Tater |
| 5,551,021 A | 8/1996 | Harada |
| 5,583,778 A | 12/1996 | Wind |
| 5,592,590 A | 1/1997 | Jolly |
| 5,603,025 A | 2/1997 | Tabb |
| 5,606,496 A | 2/1997 | D'Agostino |
| 5,611,052 A | 3/1997 | Dykstra |
| 5,615,109 A | 3/1997 | Eder |
| 5,615,341 A | 3/1997 | Srikant et al. |
| 5,623,591 A | 4/1997 | Cseri |
| 5,644,727 A | 7/1997 | Atkins |
| 5,649,116 A | 7/1997 | McCoy |
| 5,655,085 A | 8/1997 | Ryan |
| 5,657,388 A | 8/1997 | Weiss |
| 5,657,437 A | 8/1997 | Bishop et al. |
| 5,657,460 A | 8/1997 | Egan et al. |
| 5,664,127 A | 9/1997 | Anderson et al. |
| 5,671,363 A | 9/1997 | Cristofich et al. |
| 5,675,746 A | 10/1997 | Marshall |
| 5,689,650 A | 11/1997 | McClelland et al. |
| 5,717,865 A | 2/1998 | Stratmann |
| 5,721,847 A | 2/1998 | Johnson |
| 5,727,161 A | 3/1998 | Purcell, Jr. |
| 5,732,397 A | 3/1998 | DeTore |
| 5,758,328 A | 5/1998 | Giovannoli |
| 5,764,923 A | 6/1998 | Tallman et al. |
| 5,765,144 A | 6/1998 | Larche |
| 5,768,158 A | 6/1998 | Adler et al. |
| 5,774,878 A | 6/1998 | Marshall |
| 5,774,883 A | 6/1998 | Andersen et al. |
| 5,799,286 A | 8/1998 | Morgan et al. |
| 5,802,502 A | 9/1998 | Gell |
| 5,812,968 A | 9/1998 | Hassan |
| 5,819,237 A | 10/1998 | Garman |
| 5,842,178 A | 11/1998 | Giovannoli |
| 5,848,400 A | 12/1998 | Chang |
| 5,852,811 A | 12/1998 | Atkins |
| 5,870,721 A | 2/1999 | Norris |
| 5,873,096 A | 2/1999 | Lim |
| 5,875,437 A | 2/1999 | Atkins |
| 5,878,258 A | 3/1999 | Pizi |
| 5,878,403 A | 3/1999 | Agrawal et al. |
| 5,913,202 A | 6/1999 | Motoyama |
| 5,918,217 A | 6/1999 | Maggioncalda |
| 5,920,848 A | 7/1999 | Schutzer |
| 5,930,775 A | 7/1999 | McCauley |
| 5,940,811 A | 8/1999 | Norris |
| 5,940,812 A | 8/1999 | Tengel et al. |
| 5,950,175 A | 9/1999 | Austin |
| 5,963,953 A | 10/1999 | Cram et al. |
| 5,970,467 A | 10/1999 | Alavi |
| 5,974,396 A | 10/1999 | Anderson |
| 5,978,779 A | 11/1999 | Stein et al. |
| 5,983,206 A | 11/1999 | Oppenheimer |
| 5,987,434 A | 11/1999 | Libman |
| 5,991,741 A | 11/1999 | Speakman et al. |
| 5,995,942 A | 11/1999 | Smith et al. |
| 5,999,907 A | 12/1999 | Donner |
| 6,008,817 A | 12/1999 | Gilmore, Jr. |
| 6,009,415 A | 12/1999 | Shurling et al. |
| 6,018,722 A | 1/2000 | Ray et al. |
| 6,021,397 A | 2/2000 | Jones et al. |
| 6,026,370 A | 2/2000 | Jermyn |
| 6,029,139 A | 2/2000 | Cunningham et al. |
| 6,029,195 A | 2/2000 | Herz |
| 6,032,125 A | 2/2000 | Ando |
| 6,044,371 A | 3/2000 | Person et al. |
| 6,055,510 A | 4/2000 | Henrick |
| 6,055,517 A | 4/2000 | Friend et al. |
| 6,064,985 A | 5/2000 | Anderson |
| 6,070,147 A | 5/2000 | Harms et al. |
| 6,073,115 A | 6/2000 | Marshall |
| 6,076,072 A | 6/2000 | Libman |
| 6,078,892 A | 6/2000 | Anderson et al. |
| 6,078,901 A | 6/2000 | Ching |
| 6,088,686 A | 7/2000 | Walker et al. |
| 6,089,284 A | 7/2000 | Kaehler et al. |
| 6,092,050 A | 7/2000 | Lungren et al. |
| 6,097,391 A | 8/2000 | Wilcox |
| 6,108,641 A | 8/2000 | Kenna et al. |
| 6,122,623 A | 9/2000 | Garman |
| 6,154,731 A | 11/2000 | Monks et al. |
| 6,173,270 B1 | 1/2001 | Cristofich et al. |
| 6,185,582 B1 | 2/2001 | Zellweger et al. |
| 6,188,403 B1 | 2/2001 | Sacerdoti et al. |
| 6,188,405 B1 | 2/2001 | Czerwinski et al. |
| 6,188,993 B1 | 2/2001 | Eng et al. |
| 6,195,092 B1 | 2/2001 | Dhond et al. |
| 6,199,077 B1 | 3/2001 | Inala et al. |
| 6,202,053 B1 | 3/2001 | Christiansen et al. |
| 6,202,054 B1 | 3/2001 | Lawlor et al. |
| 6,205,453 B1 | 3/2001 | Tucker et al. |
| 6,212,494 B1 | 4/2001 | Boguraev |
| 6,222,557 B1 | 4/2001 | Pulley, IV et al. |
| 6,236,978 B1 | 5/2001 | Tuzhilin |
| 6,243,093 B1 | 6/2001 | Czerwinski et al. |
| 6,249,775 B1 | 6/2001 | Freeman et al. |
| 6,256,649 B1 | 7/2001 | Mackinlay et al. |
| 6,263,320 B1 | 7/2001 | Danilunas et al. |
| 6,269,346 B1 | 7/2001 | Cristofich et al. |
| 6,271,863 B1 | 8/2001 | Bose et al. |
| 6,278,981 B1 | 8/2001 | Dembo et al. |
| 6,282,551 B1 | 8/2001 | Anderson et al. |
| 6,311,144 B1 | 10/2001 | Abu El Ata |
| 6,317,726 B1 | 11/2001 | O'Shaughnessy |
| 6,317,750 B1 | 11/2001 | Tortolani et al. |
| 6,321,212 B1 | 11/2001 | Lange |
| 6,330,551 B1 | 12/2001 | Burchetta et al. |
| 6,349,290 B1 | 2/2002 | Horowitz et al. |
| 6,349,291 B1 | 2/2002 | Varma |
| 6,360,188 B1 | 3/2002 | Freidman et al. |
| 6,363,393 B1 | 3/2002 | Ribitzky |
| 6,405,204 B1 | 6/2002 | Baker et al. |
| 6,452,613 B1 | 9/2002 | Lefebvre et al. |
| 6,490,569 B1 | 12/2002 | Grune et al. |
| 6,496,832 B2 | 12/2002 | Chi et al. |
| 6,502,080 B1 | 12/2002 | Eichorst et al. |
| 6,513,018 B1 | 1/2003 | Culhane |
| 6,597,379 B1 | 7/2003 | Morris et al. |
| 6,601,044 B1 | 7/2003 | Wallman |
| 6,624,752 B2 | 9/2003 | Klitsgaard et al. |
| 6,725,257 B1 | 4/2004 | Cansler et al. |
| 6,741,975 B1 | 5/2004 | Nakisa et al. |
| 6,785,661 B1 | 8/2004 | Mandler et al. |
| 6,850,923 B1 | 2/2005 | Nakisa et al. |
| 6,892,052 B2 | 5/2005 | Kotola et al. |
| 6,985,880 B1 | 1/2006 | Hodgdon et al. |
| 6,999,943 B1 | 2/2006 | Johnson et al. |
| 7,181,427 B1 | 2/2007 | DeFrancesco et al. |
| 7,406,442 B1 | 7/2008 | Kottmeier, Jr. et al. |
| 7,409,364 B1 | 8/2008 | Barton et al. |
| 2001/0011243 A1 | 8/2001 | Dembo et al. |
| 2001/0027437 A1 | 10/2001 | Turbeville et al. |
| 2001/0056398 A1* | 12/2001 | Scheirer .................. 705/38 |
| 2002/0007330 A1 | 1/2002 | Kumar et al. |
| 2002/0019791 A1 | 2/2002 | Goss et al. |
| 2002/0019802 A1 | 2/2002 | Malme et al. |
| 2002/0019803 A1 | 2/2002 | Muller |
| 2002/0059139 A1 | 5/2002 | Evans |

| | | | |
|---|---|---|---|
| 2002/0067373 | A1 | 6/2002 | Roe et al. |
| 2002/0073005 | A1 | 6/2002 | Welnicki et al. |
| 2002/0078086 | A1 | 6/2002 | Alden et al. |
| 2002/0111850 | A1 | 8/2002 | Smrckas et al. |
| 2002/0111890 | A1 | 8/2002 | Sloan et al. |
| 2002/0133383 | A1 | 9/2002 | Chao et al. |
| 2002/0147668 | A1 | 10/2002 | Smith et al. |
| 2002/0198797 | A1 | 12/2002 | Cooper et al. |
| 2003/0018492 | A1 | 1/2003 | Carlson |
| 2003/0028466 | A1 | 2/2003 | Jenson et al. |
| 2003/0061132 | A1 | 3/2003 | Yu, Sr. et al. |
| 2003/0061137 | A1 | 3/2003 | Leung et al. |
| 2003/0093351 | A1 | 5/2003 | Sarabanchong |
| 2003/0208422 | A1* | 11/2003 | Burczyk .................... 705/35 |
| 2003/0212628 | A1 | 11/2003 | Kuttan et al. |
| 2003/0216965 | A1 | 11/2003 | Libman |
| 2003/0229582 | A1 | 12/2003 | Sherman et al. |
| 2003/0233302 | A1* | 12/2003 | Weber et al. .............. 705/36 |
| 2004/0030626 | A1 | 2/2004 | Libman |
| 2004/0039588 | A1 | 2/2004 | Libman |
| 2004/0054610 | A1 | 3/2004 | Amstutz et al. |
| 2004/0054622 | A1 | 3/2004 | Strayer et al. |
| 2004/0117300 | A1 | 6/2004 | Jones et al. |
| 2004/0186773 | A1 | 9/2004 | George et al. |
| 2004/0236641 | A1 | 11/2004 | Abbott et al. |
| 2004/0267651 | A1 | 12/2004 | Jenson et al. |
| 2005/0004855 | A1 | 1/2005 | Jenson et al. |
| 2005/0004856 | A1 | 1/2005 | Brose et al. |
| 2005/0010510 | A1 | 1/2005 | Brose et al. |
| 2005/0027632 | A1 | 2/2005 | Zeitoun et al. |
| 2005/0060252 | A1 | 3/2005 | Doddington |
| 2005/0144108 | A1 | 6/2005 | Loeper |

FOREIGN PATENT DOCUMENTS

| | | |
|---|---|---|
| JP | 2002163589 | 6/2002 |
| WO | 9927479 | 6/1999 |
| WO | 00/02256 | 1/2000 |
| WO | 02/069212 | 9/2002 |

OTHER PUBLICATIONS

Asch; How the RMA/Fair ISAAC Credit-Scoring Model Was Built, Journal of Commercial Lending, vol. 77, No. 10, Jun. 1995, pp. 10-16.
Taylor et al.; Card Issuers Turn to Scoring as They Face Increasing Risk, Financial Services Report, vol. 8, No. 15, Jul. 24, 1991, p. 1.
Roger et al.; A Credit Scoring Model to Evaluate the Credit Worthiness of Credit Card Applicants, Developments in Marketing Science, vol. 5, 1982.
Hickman; Using Software to Soften Big-Time Competition, Bank Systems and Technology, vol. 31, No. 8, Jun. 1994, pp. 38-40.
Sullivan; Scoring Borrower Risk, Mortgage Banking, vol. 55, No. 2, Nov. 1994, pp. 94-98.
Jameson; Expanding Risk Management Strategies: Key to Future Survival, Credit World, vol. 84, No. 5, May 1996, pp. 16-18.
Friedland; Credit Scoring Digs Deeper Into Data, Credit World, vol. 84, No. 5, May 1996, pp. 19-23.
Credit Scoring New Markets, Bank Technology News, vol. 9, No. 7, Jul. 1996, p. 1.
Carey; The Sub-Prime Credit Market: Identifying Good Risks for Unsecured Cards, Credit World, vol. 85, No. 1, Sep. 1996, pp. 13-15.
Opportunity Knocks at Scoring'S Door, Collection and Credit Risk, vol. 2, No. 4, Apr. 1997, p. 53.
Makuch; Managing Consumer Credit Delinquency in the US Economy: a Multi-Billion Dollar Management Science Application, Interfaces, Feb. 1992, pp. 90-109.
Portner; There Must Be a Better Way, Mortgage Banking, vol. 53, No. 2, Nov. 1, 1992, pp. 12-22.
Product Data Integration Technologies, Inc., Step Integratin Authors, Printed on Apr. 26, 1999.
Freemarkets, Printed on Apr. 26, 1999.
At Your Request, www.wingspanbank.com, Sep. 28, 1999.
Meredith; Internet Bank Moves Closer to Virtual Reality, USA Today, May 5, 1995.
CSU/DSU (Channel Service Unit/Data Service Unit), CTI (Computer-Telephony Integration), pp. 208-210.

Kneis; Hedge Fund Strategies: A Primer, Canadianhedgewatch, p. 3.
Derivatives Primer, Ceiba, Association for Financial Professionals, Committee on Investment of Employee Benefit Assets, Dec. 2001.
Hedge Fund Primer—The Basics, KSP Capital Management LLC, Information@KSPcapital.com, Printed Jul. 24, 2002, 18 Pages.
Armstrong; Fund of Funds: Perfect Solution or Dangerous Shortcut?, Investor Solutions, Inc., www.investorsolutions.com, Printed Jul. 24, 2002.
Hedge Fund Primer About Fund of Funds, Links Securities LLC, www.hedgefund.net/prime_fof.php3, 2002, 2 Pages.
Why a Fund of Funds?, Altegris Investments, www.managedinvestments.com/hedge_fund_of_funds, Printed Jul. 24, 2002.
Trading and Capital-Markets Activities Manual, Instrument Profiles: Structured Notes, Federal Reserve System, The Turin Group, www.toerien.com/books/manual/4040.htm, Printed Jul. 24, 2002, 14 Pages.
Primer: Derivatives Instruments, Derivatives Study Center, www.econstrat.org/dscinstruments.htm, Printed Jul. 24, 2002, 8 Pages.
Pourmokhtar; A Hedge Fund Primer Version 0.1, www.emf.net/?farzin/hedgefund.html, Printed Jul. 24, 2002, 5 Pages.
Huddling With William Bernstein: Small Town Doctor, Investing Pro.
Bogle; Mutual Funds at the Millennium: Fund Directors and Fund Myths, The Vanguard.
Group to the '40 ACT Institute of PLI (Practicing Law Institute), New York, NY, May 15, 2000, 15 Pages.
Quinn; Credit Card Issuers Keeping a Closer Watch on how you pay Bills, Washington Post, Staying Ahead, Business Section P6, Apr. 25, 1988, 1 Page.
Spirer; When Bad Credit Behavior Becomes the Norm, Credit World, vol. 85, Iss. 6, Jul./Aug. 1997, p. 18.
Markese; Can You Trust Mutual Fund Rankings?, Consumers' Research Magazine, vol. 76, No. 10, Research Library, Oct. 1993, p. 20.
McLaughlin; Tapping Web to Search for Right Fund—Fundprofiler Speeds Search, Boston Herald, Boston, MA, Dec. 16, 1999, p. 70.
Cumby et al; Evaluating the Performance of International Mutual Funds, The Journal of Finance, vol. 45, No. 2, Jun. 1990, pp. 497-521.
Gottfried et al.; Graphical Definitions: Making Spreadsheets Visual Through Direct Manipulation and Gestures, Visual Languages, 1997, Proceedings, 1997 IEEE Symposium on, Sep. 23-26, 1997, pp. 246-253, Abstract.
GS-CALC 6.0.1.1.; JPS Development; http://download.com, Printed Sep. 3, 2003.
Buchner et al.; Hotdoc: A Flexible Framework for Spatial Composition, Visual Languages, 1997, Proceedings, 1997 IEEE Symposium, Abstract, Sep. 23-26, 1997, pp. 92-99.
Snyder et al.; Indentifying Design Requirements Using Analysis Structures, Aerospace and Electronics Conference, 1991, NAECON, 1991, vol. 2, Abstract, May 20-24, 1991, pp. 786-792.
Davenport et al.; Numbers-A Medium That Counts [Spreadsheet Software]; Computer Graphics and Applications; IEEE; vol. 11; Issue 4; Abstract, Jul. 1991, pp. 39-44.
Stolte et al.; Polaris: A System for Query, Analysis, and Visualization of Multidimensional Relational Databases; Visualization and Computer Graphics; IEEE Transactions on; vol. 8; Issue 1; Abstract, Jan./Mar. 2002, pp. 52-65.
Chi et al.; Principles for Information Visualization Spreadsheets; Computer Graphics and Applications; IEEE; vol. 18; Issue 4; Abstract, Jul./Aug. 1998, pp. 92-99.
Spreadsheet Mapper; www.panopticon.com., Printed Oct. 1, 2003.
TCS 4.20; Telsys SAS; http://download.com, Printed Sep. 30, 2003.
Spoerri; Visual Tools for Information Retrieval; Visual Languages; 1993; Proceedings; 1993 IEEE Symposium on; pp. 160-168; Abstract.
Internet; Lending Tree, Mortgage Apply Online in Minutes, www.lendingtree.com, 7 Pages, Printed Feb. 1, 1999.
Storms, Phillip; Using Mortgage Credit to Achieve Client Objectives, Journal of Financial Planning, ISSN/ISBN: 10403981, Proquest Document ID: 10403981, vol. 9, Issue 5, 9 Pages, Oct. 1996.
Storms, Phillip; Using Mortgage Credit to Achieve Client Objectives, Journal of Financial Planning, ISSN/ISBN: 10403981; Proquest Document ID:10403981; Denver: vol. 9; Issue 5; 9 Pages, Oct. 1996.

Anonymous, "Am Ex-Costco Co-Brand: Is it a Marketing or Merchant Acceptance Strategy?" proquest.umi.com, Card News, Potomac, vol. 14, Issue 16, p. 1 (Aug. 25, 1999).

Anonymous, "Two Chips can be Better Than One," proquest.umi.com, Card Technology, New York, p. 40 (May 2001).

cardweb.com, "Kmart MasterCard (Sep. 26, 2000),"0 (2000).

Hinds, Michael, "Making The Most of Fast Falling Mortgage Rates," New York Times, Late City Final Ed, col. 2, p. 1 (Jun. 30, 1985).

Jazzy Jeff, "Credit Card Commentaries," cardoffers.com, The Credit Card Directory, Posted Commentaries: Kmart MasterCard (2003).

* cited by examiner

FIG. 15

COBRA REPORT — ALM Advisory Group

1500

| | Expected (USD mm) | | | | | Budget-at-Risk (USD mm) | | | | | Quarterly |
|---|---|---|---|---|---|---|---|---|---|---|---|
| | Q1 | Q2 | Q3 | Q4 | Total | Q1 | Q2 | Q3 | Q4 | Total | Average |
| Gross Profit | 835 | 834 | 833 | 832 | 3,333 | 13 | 25 | 36 | 45 | 111 | 30 |
| Interest Income | 1 | 2 | 2 | 2 | 6 | 0 | 0 | 0 | 0 | 1 | 0 |
| Interest Expense | -57 | -64 | -62 | -63 | -246 | 1 | 3 | 5 | 7 | 14 | 4 |
| FX Translation | 0 | 1 | 1 | 0 | 2 | 19 | 20 | 21 | 19 | 44 | 20 |
| Inter-company Cash Flow | 50 | 50 | 50 | 49 | 199 | 0 | 3 | 4 | 5 | 12 | 3 |
| Total Budget | 829 | 823 | 822 | 820 | 3,295 | 10 | 28 | 35 | 46 | 182 | 30 |
| After Forward Hedge | 829 | 823 | 822 | 820 | 3,295 | 1 | 3 | 5 | 7 | 14 | 4 |

| | Worst Case Scenario (USD mm) | | | | | Best Case Scenario (USD mm) | | | | | |
|---|---|---|---|---|---|---|---|---|---|---|---|
| | Q1 | Q2 | Q3 | Q4 | Total | Q1 | Q2 | Q3 | Q4 | Total | |
| Gross Profit | 822 | 808 | 796 | 787 | 3,222 | 847 | 860 | 869 | 877 | 3,440 | |
| Interest Income | 1 | 1 | 1 | 1 | 5 | 1 | 2 | 2 | 2 | 7 | |
| Interest Expense | -58 | -66 | -67 | -69 | -260 | -56 | -61 | -58 | -57 | -234 | |
| FX Translation | -19 | -18 | -20 | -19 | -42 | 21 | 21 | 20 | 19 | 41 | |
| Inter-company Cash Flow | 49 | 47 | 45 | 44 | 187 | 50 | 53 | 54 | 55 | 211 | |
| Total Budget | 819 | 794 | 787 | 774 | 3,212 | 839 | 849 | 861 | 866 | 3,378 | |
| Total Budget After Forward Hedge | 829 | 819 | 817 | 813 | 3,281 | 830 | 826 | 827 | 827 | 3,307 | |

SYSTEM AND METHOD FOR MANAGING RISK

FIELD OF THE INVENTION

The present invention relates generally to optimizing risk profiles, and, more particularly, to systems and methods for managing financial market risk in a company budget.

BACKGROUND OF THE INVENTION

In today's business environment, large companies are faced with the challenge of measuring their budgets and making economic decisions based on various dynamic economic factors. In such circumstances, for a company, measuring the budget involves forecasting and estimating the levels of interest rates, foreign exchange rates, commodities prices, and other financial variables over the course of several accounting periods. For example, a U.S. based company may have subsidiaries in England and Japan. While the company may have certain expectations regarding revenues from each of the subsidiaries, changes in the exchange rates of those countries, with respect to the U.S., can add uncertainty into the company's budget forecasts, and thus, add budgetary financial market risk.

Thus, in making budgetary forecasts, there can be considerable uncertainty around these budgeted levels, which can have a large negative impact on the realized budget. In turn, any financial market risk in the treasury budget directly impacts corporate earnings financial market risk. Thus, the financial market risk in the treasury budget needs to be measured and managed. Present methods of measuring and managing a treasury budget, however, have certain deficiencies. Present methods of measuring and managing a treasury budget can result in an overly high estimate of financial market risks. In addition, present methods of managing financial market risk in a treasury budget can include the creation of separate hedges to separately mitigate financial market risk for each of a number of financial market risk factors. Such creation of separate hedges tends to be relatively expensive. Also, when the separate hedges are taken together in aggregate, in certain circumstances, the cumulative effect of the separate hedges may be contradictory.

Further, present methods of managing the financial market risk in a budget typically result in an overestimation of the financial market risk in the budget, and consequently, over hedging. In addition, the hedges pursued are often more expensive than is necessary to achieve an acceptable level of financial market risk reduction, which involves reducing the level of financial market risk to an acceptable amount.

Thus, there is a need for an improved system and method for evaluating and managing financial market risk.

SUMMARY OF THE INVENTION

Embodiments of the present invention satisfy these and other needs by providing to a company improved systems and methods for managing financial market risk.

Embodiments of the invention are directed to systems and methods for managing financial market risk. The method can include defining an exposure map for the treasury budget, calculating and categorizing the financial market risk to the budget, and producing a financial market risk analysis report. The method can also include defining a hedge to minimize or mitigate financial market risks and costs. The hedge can be a basket hedge.

The method can also include identifying the financial market risk factors impacting on each element of the budget, generating scenarios for market rates, and producing a report after hedging. Evaluating the financial market risk to the budget under stress scenarios can also be included. Defining the exposure map for the treasury budget can include defining exposure related to gross profit, current assets and current liabilities, interest bearing liabilities and inter-company dividends, and/or budgeted levels for yields, rates and prices. Embodiments of the invention are directed to a method for minimizing financial market risk related to a company budget. The method can include measuring financial market risks to the company budget related to one or more financial market risk factors, identifying offsetting financial market risk factors, and identifying one or more correlations between two or more financial market risk factors. Defining a hedge, based on the offsetting financial market risks and the correlations, can also be included.

Thus, by way of embodiments of the invention, financial market risks to the overall budget are not overestimated, relatively less hedging is necessary, and the total hedging costs can be lowered. These and/or other results can be achieved by analyzing the effect of correlated financial market risk factors on portions of a budget.

BRIEF DESCRIPTION OF THE DRAWINGS

The present invention will be more readily understood from the detailed description of exemplary embodiments presented below considered in conjunction with the attached drawings, of which:

FIG. 15 is an exemplary screen shot showing a report including worst-case and best-case scenario budget levels.

It is to be understood that the attached drawings are for purposes of illustrating the concepts of the invention.

DETAILED DESCRIPTION OF THE INVENTION

Embodiments of the invention can be used to takes a portfolio-wide approach to risk management. This portfolio-wide approach allows for the identification of individual financial market risks, as well as any correlations or offsetting relationships between the different financial market risks. Analyzing the financial market risks on a portfolio-wide basis, and taking the interactions and relationships of the individual financial market risks into account allows for improved management of financial market risks.

For example, the probability of two unfavorable events happening together, such as, for example, a foreign exchange loss and a commodity loss, is typically much less than the probability of either event occurring individually. Thus, the total financial market risk level of a portfolio is typically less than the sum of the individual financial market risks of the individual components of the portfolio. In addition, hedging one low probability outcome for a portfolio, in accordance with embodiments of the invention, is typically less costly than hedging two moderate probability outcomes for the components of the portfolio. Embodiments of the invention provide a system and method for calculating the financial market risk to a portfolio on a portfolio-wide basis, and identifying opportunities for implementing hedges for relatively low probability events.

Figure 1:
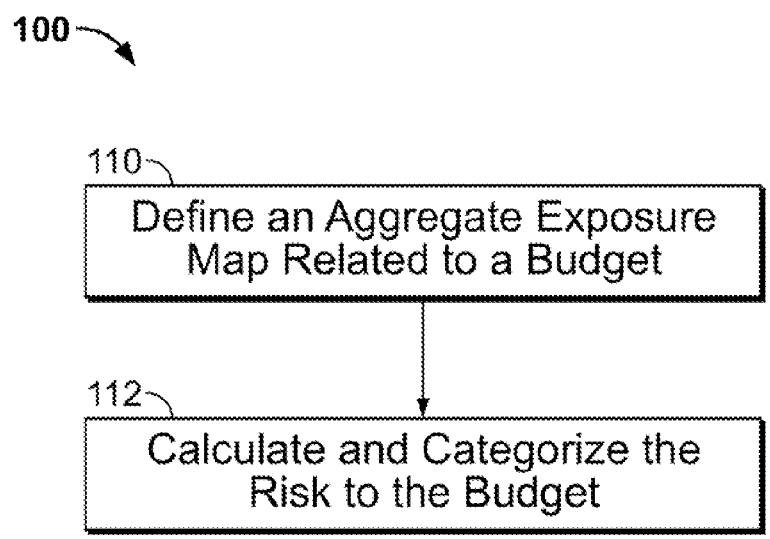
FIG. 1 is an exemplary flow diagram illustrating a method of managing a budget, in accordance with an embodiment of the present invention.

FIG. 1 depicts a method 100 of managing a budget, in accordance with embodiments of the invention. In some embodiments, an aggregate exposure map related to a budget is created. Step 110. As described in further detail below, the exposure map is a portfolio financial market risk model that evaluates the impact of various financial market risk drivers on future performance of a budget. As used herein, an exposure map is a mapping of financial market risk factors to the relevant exposures in the budget elements and can be used to evaluate uncertainty in terms of budget performance metrics. In step 112, the financial market risk to the budget is calculated and/or categorized.

Figure 2:
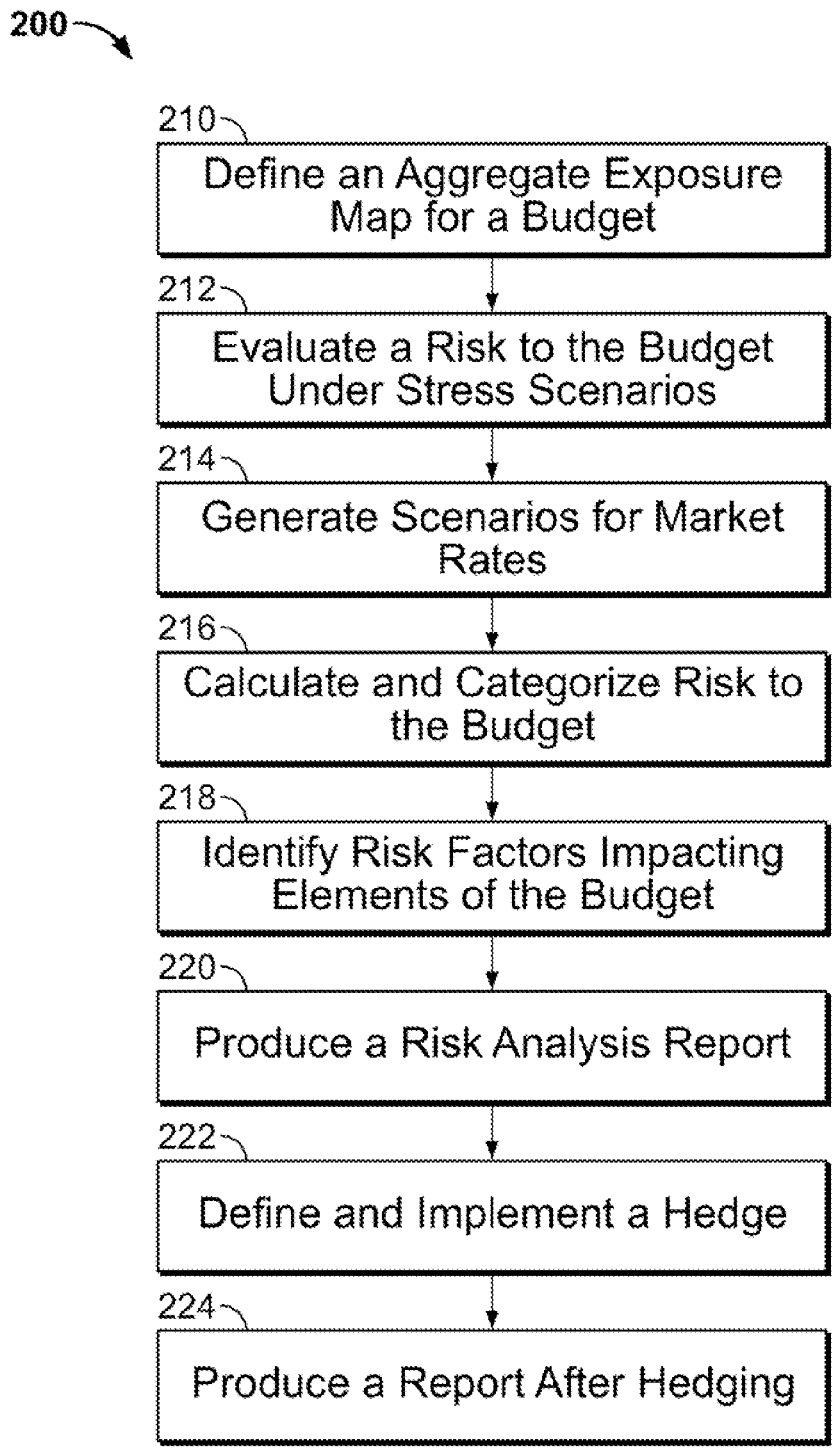
FIG. 2 is an exemplary flow diagram illustrating a method of managing a budget, in accordance with an embodiment of the present invention.

FIG. 2 depicts another method 200 of managing a budget, in accordance with embodiments of the invention. By way of the method, an aggregate exposure map for a budget is defined, as described above. Step 210. The financial market risk to the budget under certain stress scenarios is then evaluated. Step 212. In step 214, scenarios are generated for certain market rates. For example, certain worst-case scenarios used, whether given, or generated by using models for interest rates, commodity prices and foreign exchange rates can be plugged into a budget model and the projected results can be evaluated. In step 216, the financial market risk to the budget is calculated and categorized. Financial market risk factors impacting elements of the budget are then identified. Step 218. In step 220, a financial market risk analysis report is produced. The report can describe the total budget-at-risk for a period of time, such as, for example, a year. A hedge can then be defined and implemented. Step 222. After hedging, in step 224, a report can be produced. The report after hedging describes the resultant decrease (or increase) in financial market risk and the corresponding effect on the budget.

In alternate embodiments, additional steps may be added, certain steps may be excluded, certain steps may be performed multiple times, and/or the steps may be performed in a different order and/or simultaneously.

Figure 3:
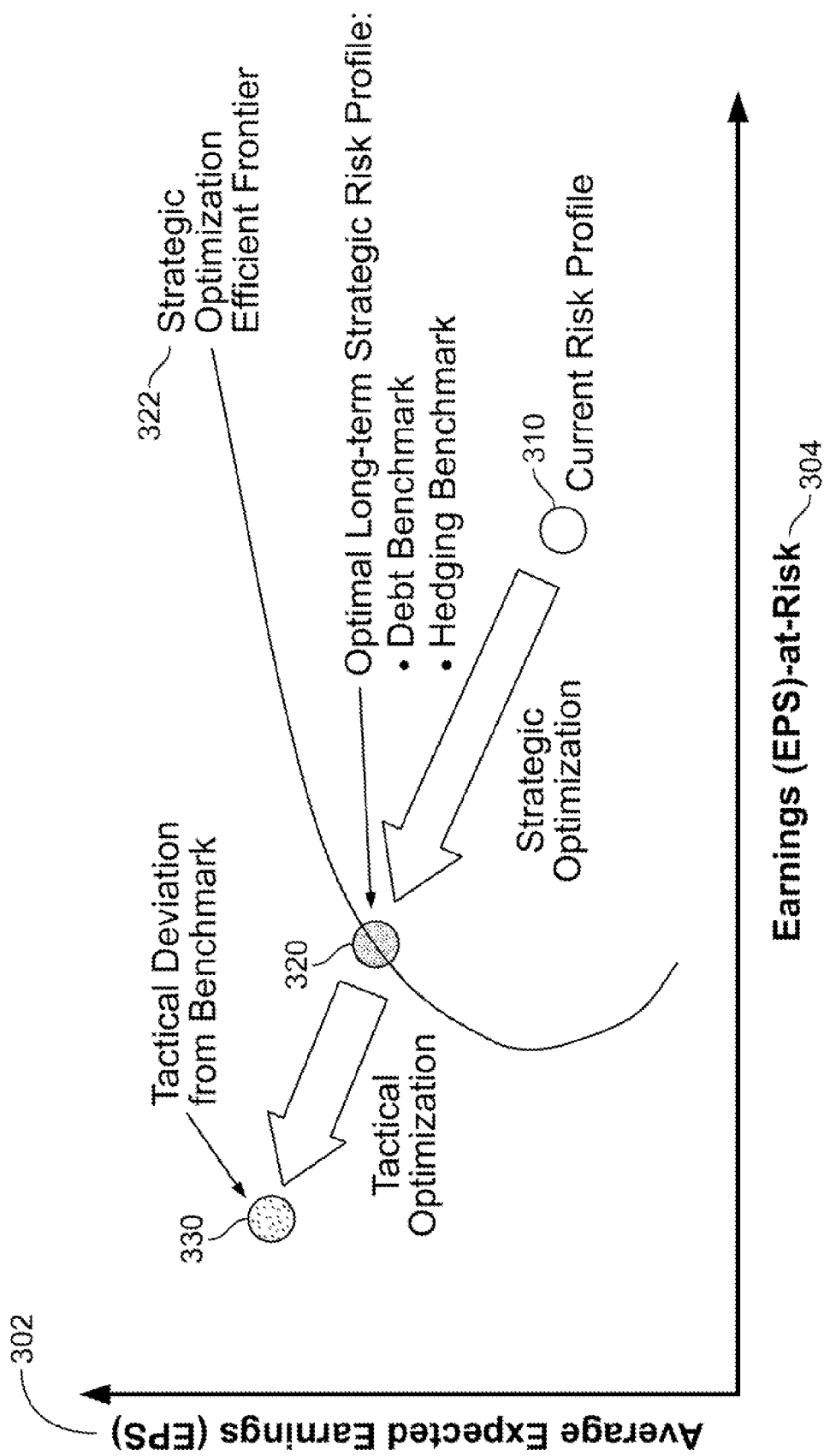
FIG. 3 is an exemplary schematic diagram, illustrating an expected earnings and earnings at financial market risk analysis, in accordance with an embodiment of the present invention.

FIG. 3 depicts an expected earnings and earnings at risk analysis 300, in accordance with embodiments of the invention. In an analysis of a company's budget, the average expected earnings 302 are plotted against earnings-at-risk 304. A current financial market risk profile 310 can be modified through strategic optimization to create an optimal financial market risk profile 320 positioned about a strategic optimization efficient frontier 322. Via tactical optimization, described in further detail below, the financial market risk profile can be shifted to a financial market risk profile 330 having higher average expected earnings 302 and relatively lower earnings-at-risk 304. The strategic optimization can involve optimizing debt liabilities by way of balancing the mix of fixed and floating debt, as well as by balancing the mix of currencies. In addition to optimizing the debt portfolio, hedging programs and other financial levers can also be employed. Tactical optimization can be achieved by optimization of interest rate, commodity, and foreign exchange positioning. A balance of over and underweight and fixed and floating interest and foreign exchange rates can be employed. In addition, tactical optimization can involve being over hedged or under hedged with respect to a specific benchmark.

Figure 4:
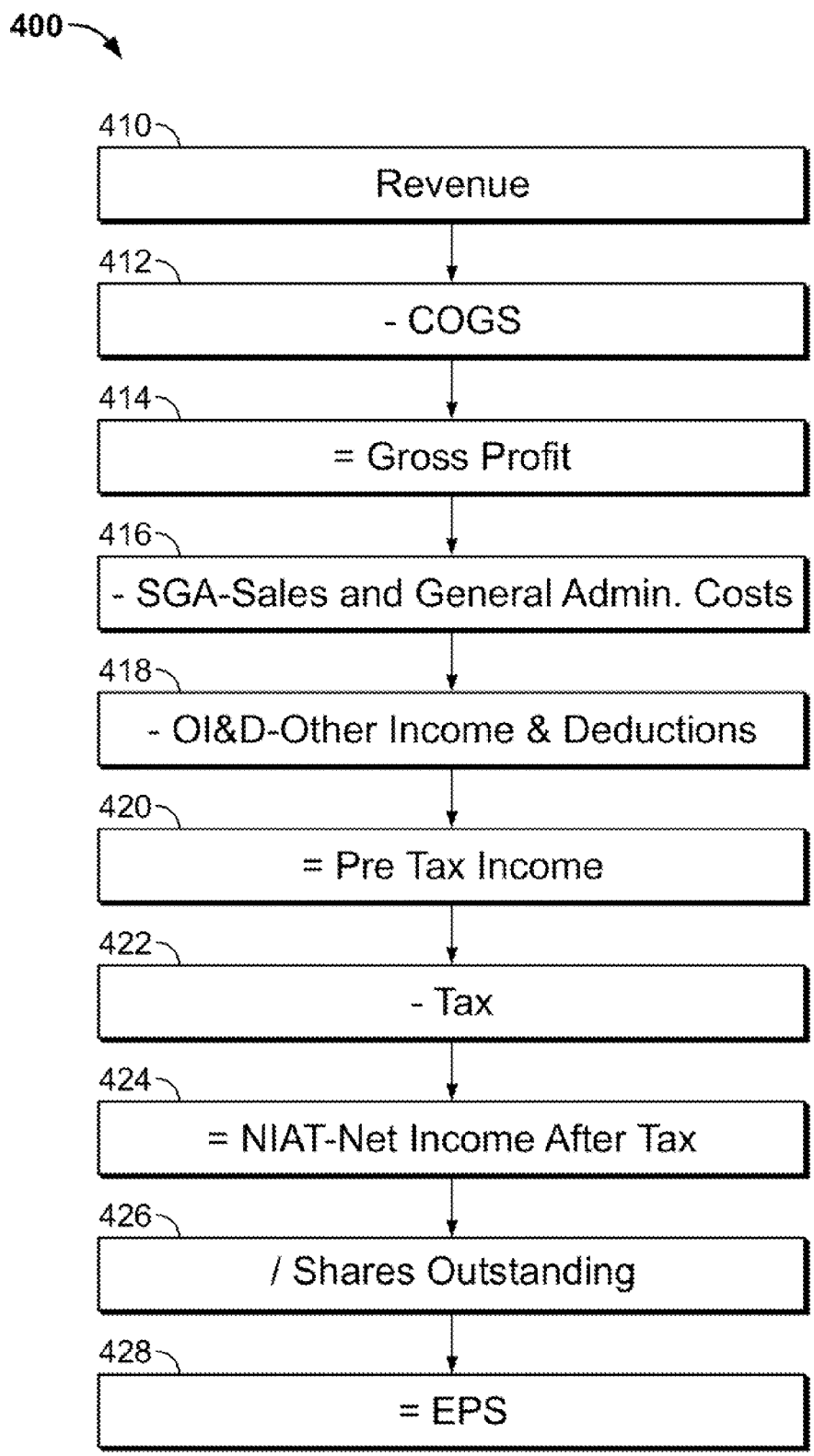
FIG. 4 is an exemplary schematic diagram illustrating revenue and cost elements of a budget from a company perspective, in accordance with an embodiment of the present invention.

FIG. 4 depicts revenue and cost elements 400 of a budget from a company perspective, in accordance with embodiments of the invention. To determine earnings per share (EPS) 428, the cost of good and services (COGS) 412 is subtracted from revenue 410 to arrive at gross profit 414. From gross profit 414 is subtracted sales and general administrative costs (SGA) 416 and combined with other income and deductions (OI&D) 418 to arrive at pre-tax income 420. From pre-tax income 420 is subtracted taxes 422 to arrive at net income after tax (NIAT) 424. Net income after tax 424 is divided by the number of shares outstanding 426 to arrive at earnings per share 428. The budget exposure map can address the full set of revenue and cost elements that have an impact on an income statement of a company. Different companies or entities can define these elements or levers in different ways, as would be known to one of skill in the art, as informed by the present disclosure.

Figure 5:
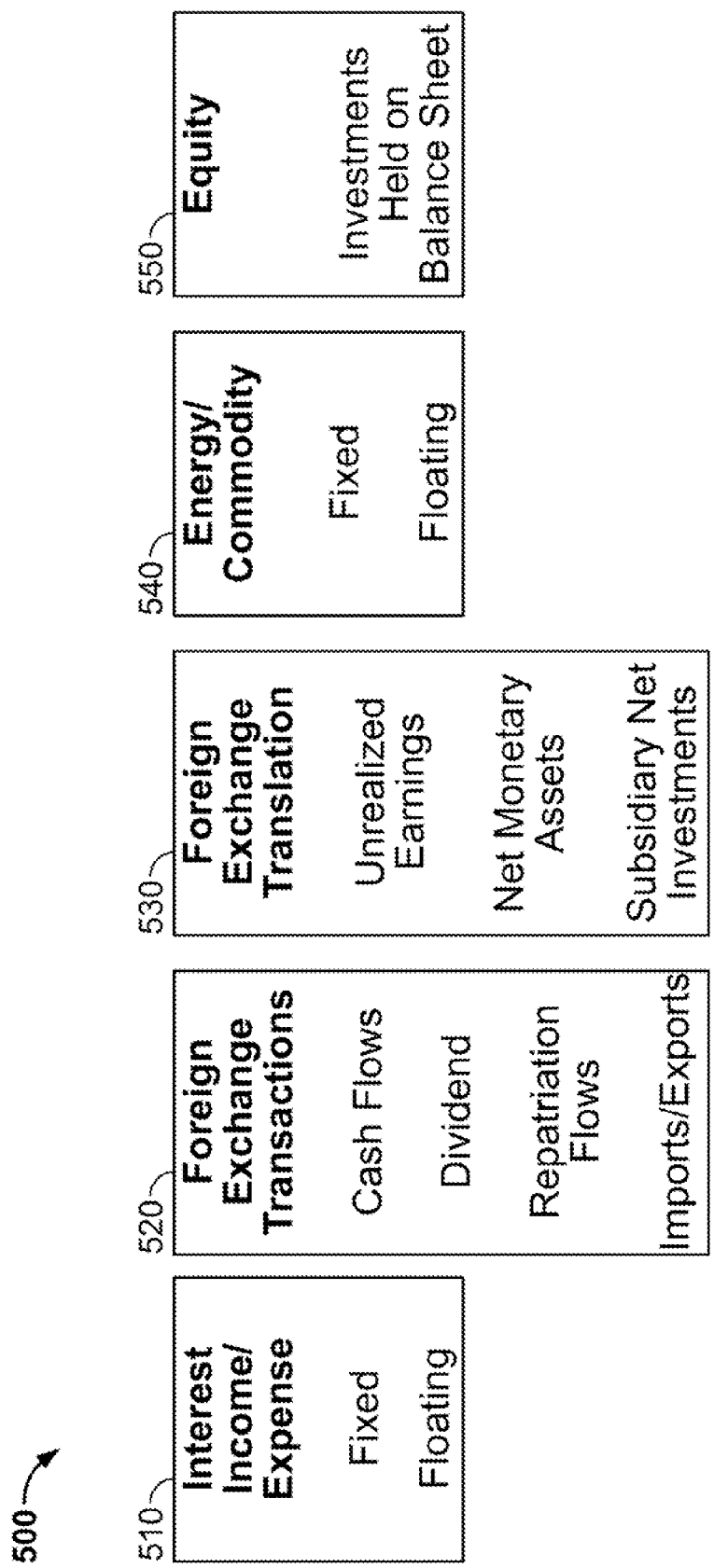
FIG. 5 is an exemplary schematic diagram illustrating financial market elements of a company budget from a treasury perspective, in accordance with an embodiment of the present invention.

FIG. 5 depicts financial market elements 500 of a company budget from a treasury perspective, in accordance with embodiments of the invention. Financial market elements 500 can include interest income/expense 510, including fixed and floating income and expense, and foreign exchange transactions 520, including cash flows, dividends, repatriation flows, and imports and exports. Financial market elements 500 can also include foreign exchange translation 530, including unrealized earnings, net monetary assets, and subsidiary net investments. Also included can be energy and commodity costs 540, and equity 550, including investments held on balance sheet.

Figure 6:
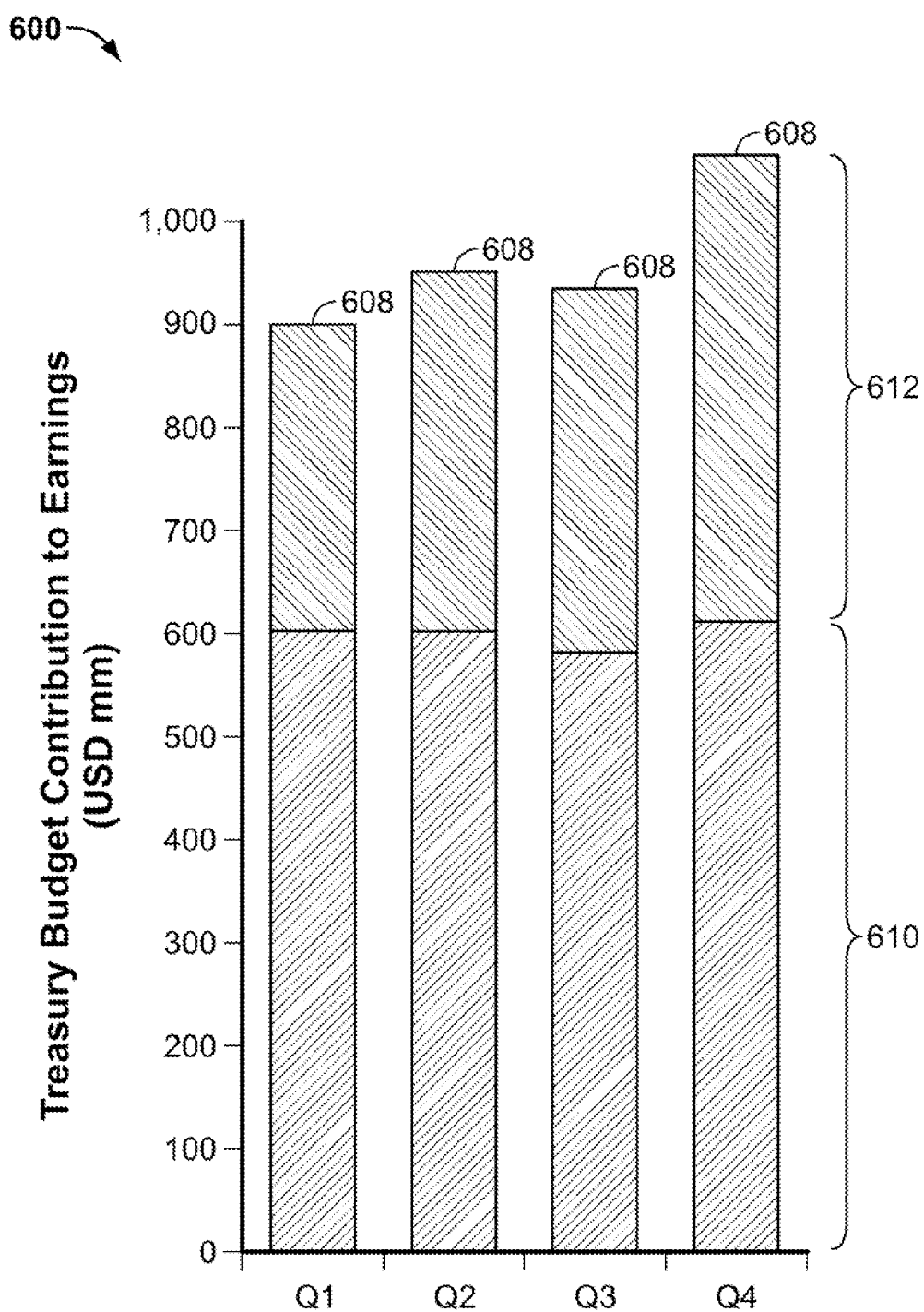
FIG. 6 is an exemplary graphic illustrating the relationship between financial market risk in a treasury budget to a financial market risk in earnings, in accordance with an embodiment of the present invention.

FIG. 6 depicts the relationship 600 between financial market risk in a treasury budget and financial market risk in earnings, in accordance with certain embodiments. The treasury budget contribution to earnings 608 can be predicted for each quarter. The financial market risk to the treasury budget can be calculated by simulation or parametric evaluation of financial market risk factors. In this analysis, measurement of the budget includes forecasting and estimating future levels of interest rates, commodity prices, foreign exchange rates, and other financial variables over the course of several accounting periods. Such predictions, however, are subject to error, and involve large amounts of uncertainty. This uncertainty leads to financial market risk in the treasury budget. The predictions can include a predicted worst case budget amount 610, as well as a predicted budget at financial market risk amount 612, which reflects a level of budget uncertainty. Once the level of budget uncertainty is measured, it can then be further analyzed and managed, as described in further detail below.

Figure 7:
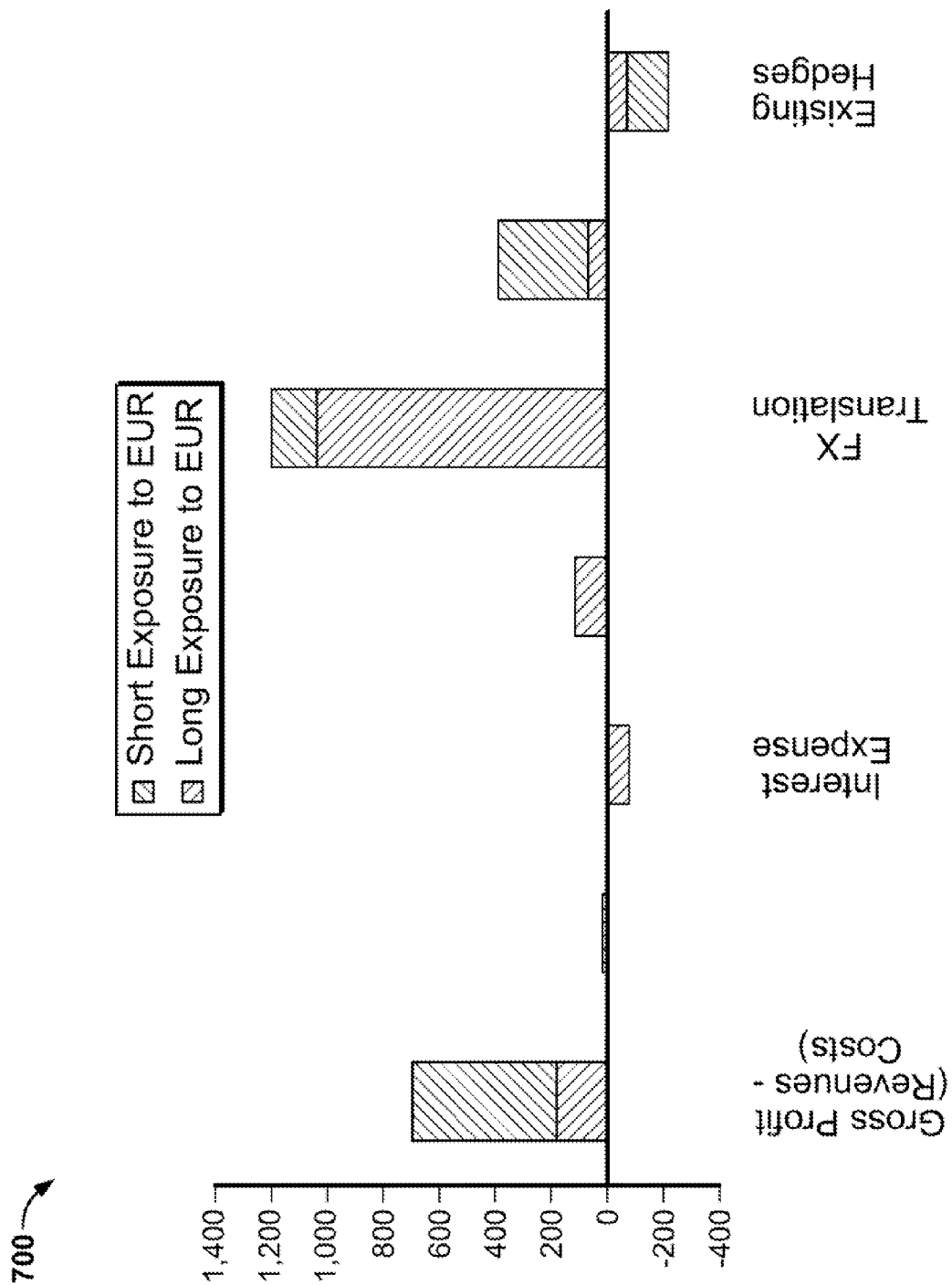
FIG. 7 is an exemplary graphic illustrating the range of foreign exchange exposures in a budget, in accordance with an embodiment of the present invention.

FIG. 7 depicts a breakdown 700 of foreign exchange exposures in a budget, in accordance with embodiments of the invention. In the breakdown 700, benefits from appreciation of foreign currency and benefits from depreciation of foreign currency are illustrated for breakdown categories of gross profit, interest expense, foreign exchange translation gain and loss, and existing hedges. By way of embodiments of the invention, these significant sources of financial market risk exposure are identified and quantified. In addition, by way of some embodiments, offsetting financial market risk exposures are identified. For example, in certain circumstances, as illustrated in exemplary FIG. 7, the financial market risk exposure in certain categories may be improved by an appreciation in a certain foreign currency, while the financial market risk exposure in a different category may be improved by a depreciation in that foreign currency. Accordingly, as the foreign currency appreciates or depreciates, the financial market risk exposure of one category will improve, while the financial market risk exposure of another category will become less favorable. Embodiments of the invention can account for such offsetting positions of financial market risk exposures. Thus, in certain circumstances, the aggregate financial market risk exposure, taking into account offsetting financial market risk exposures from different categories, can be less than a total predicted financial market risk exposure calculated by summing the worst-case scenario financial market risks from various categories without taking offsetting financial market risk exposures into account.

Thus, embodiments of the invention provide for a portfolio, or company-wide approach to measuring financial market risk which consistently takes into account offsetting financial market risk exposures, correlations between different financial market risk factors, and various benefits of diversification of financial market risk exposures. By way of evaluating the expected treasury budget under different assumptions for underlying financial market variables, such as interest rates, foreign exchange rates, commodity prices, and equity prices, as well as other market variables, some embodiments can calculate and measure an overall financial market risk to the treasury budget by incorporating the portfolio financial market risk effect of the underlying market variables.

By facilitating this type of financial market risk analysis and management, in some embodiments, company personnel (e.g., treasury) identify appropriate short-term hedging strategies for various collections of market variables. As described in further detail below, embodiments of the invention can also evaluate hedges across an entire treasury budget, and/or predetermined portions of the treasury budget. In some embodiments, other budgets can be used. In addition, embodiments can be used, not only for budget scenarios, but also for some or all components of the budget. In various embodiments, any contribution to earnings or cash flow can be used. Such evaluation can lead to significant overall savings in hedging costs by using basket hedges to take into account offsetting financial market risk exposures. As used herein, a hedge is an instrument made to reduce the effect of adverse price movements in an asset or a liability, as is known to those skilled in the art. As used herein, a basket hedge is a hedge that addresses a combination of financial market risk factors. In general, a basket hedge including a combination of financial market risk factors is less costly than separate individual hedges for each of the financial market risk factors, because the likelihood or probability of the specific combination of events or conditions occurring is typically far less than the likelihood of any of the events occurring individually.

Figure 8:
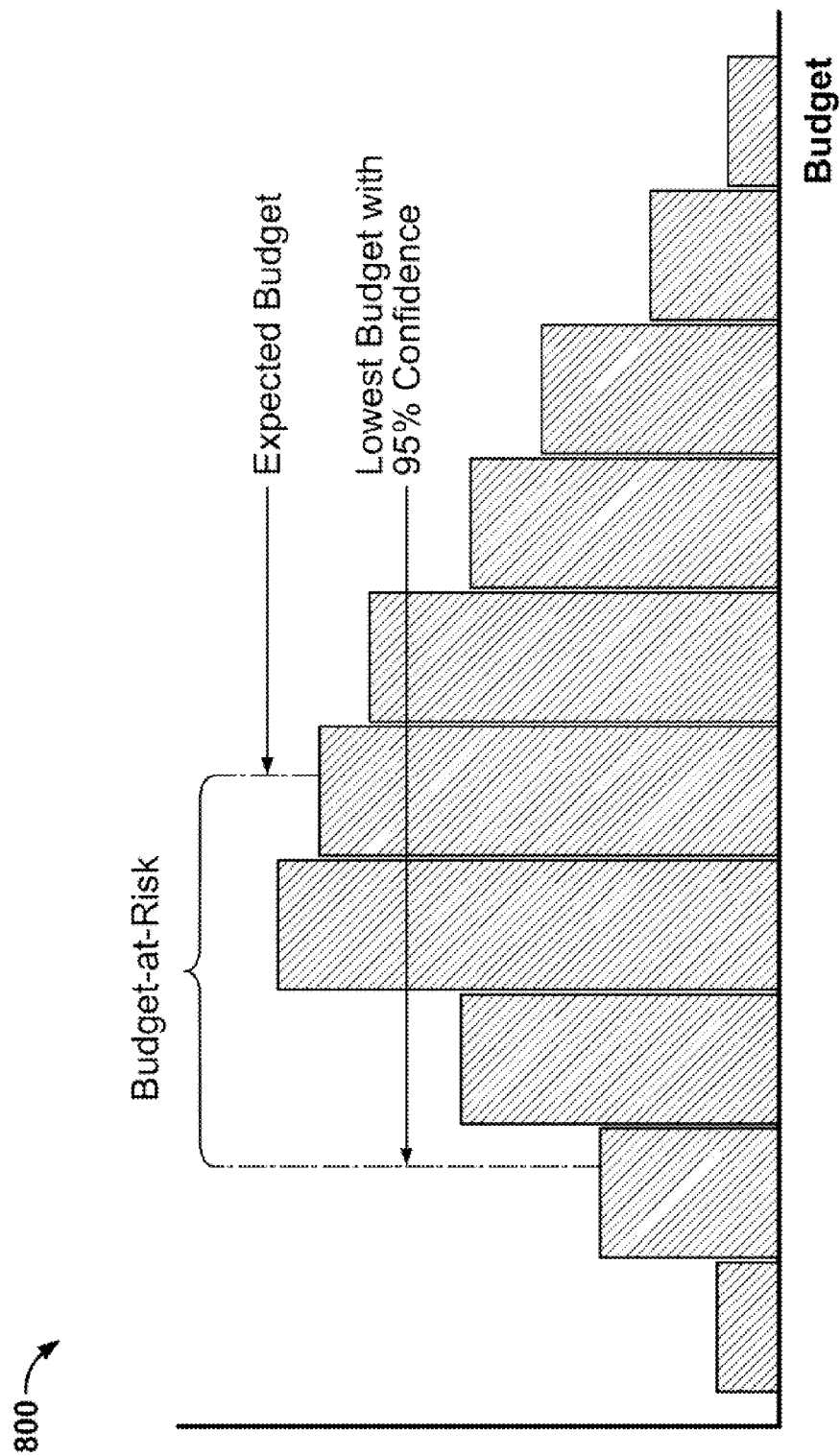
FIG. 8 is an exemplary graphic illustrating a probability distribution related to a budget exposure map, in accordance with an embodiment of the present invention.

FIG. 8 depicts a future budget value probability distribution 800, which is an analysis of the results of the exposure map under different scenarios, in accordance with embodiments of the invention. The probability distribution 800 models the expected budget, as well as the budget-at-risk within certain parameters. As used herein, the budget-at-risk is defined, for example, as the difference between the expected and worst-case budget outcome with a given confidence level. For example, a confidence level of ninety-five percent corresponds to the difference between the average and the fifth worst budget in 100 years. In such a scenario, only five percent of outcomes could be worse. Thus, the budget-at-risk provides a useful measure of the maximum underperformance of the budget relative to expectations.

In some embodiments, projection of various budget scenarios and the corresponding budget-at-risk can involve the use and combination of two different types of models, a financial market risk simulation model and an exposure map model. By way of a financial market risk simulation model, a simulation model is used to generate a large number of scenarios for interest rates, commodity prices, foreign exchange rates, and other financial market risk exposures. As part of the financial market risk simulation model, a simulation engine can generate scenarios based on either econometric forecasts or risk-neutral market forward rates, or components of both. With continued reference to FIG. 8, by way of an exposure map model, a portfolio-wide risk model is created which evaluates the impact of various financial market risk drivers on future performance. The exposure map model can use the scenarios generated by a simulation model, as described above, to evaluate the corresponding uncertainty in terms of the appropriate budget performance metric. Thus, by way of embodiments of the invention, the financial market risk to the budget can be measured in a consistent manner incorporating correlations and diversification between financial market risks. Users of embodiments of the invention can gain from such a diversification benefit.

The following general simplified example of such a diversification benefit employs two risks, a foreign exchange (FX) risk for a Euro exposure (EUR), and a foreign exchange (FX) risk for a British Pound exposure (GBP). In the example, a U.S. company expects income of $100 in EUR from a European subsidiary (EUR sub), and $100 in GBP from a British subsidiary (GBP sub). At a 95% level of confidence, the FX risk is $16.5 for the EUR sub, and $16.5 for the GBP sub. The overall portfolio risk for the company as a whole, however, is $30.4. The difference between the portfolio risk and the sum of the individual risks is the diversification benefit.

FX Risk for EUR Sub $$\text{Budget-at-Risk } (EUR\text{-}sub) = \text{Expected income} \times 1.65 \times$$
$$\text{Volatility } (EUR\text{-}FX)$$
$$= \$100 \times 1.65 \times 10\%$$
$$= \$16.5$$

FX Risk for GBP Sub $$\text{Budget-at-Risk } (GBP\text{-}sub) = \text{Expected income} \times 1.65 \times$$
$$\text{Volatility } (GBP\text{-}FX)$$
$$= \$100 \times 1.65 \times 10\%$$
$$= \$16.5$$

FX Risk for Total Company $$\text{Budget-at-Risk } (\text{Total}) = Sqrt[\text{Volatility } (EUR\text{-}FX)^2 +$$
$$\text{Volatility } (GBP\text{-}FX)^2 + \ldots 2 \times$$
$$\text{Volatility } (EUR\text{-}FX) \times \text{Volatility } (GBP\text{-}FXb) \times$$
$$\text{Correlation}(GBP\text{-}FX, EUR\text{-}FX)]$$
$$= Sqrt[16.5^2 + 16.5^2 + 2 \times 16.5 \times 16.5 \times 0.7]$$
$$= \$30.4$$

Diversification Benefit $$\text{Budget-at-Risk } (EUR\text{-}sub) + \text{Budget-at-Risk } (GBP\text{-}sub) -$$
$$\text{Budget-at-Risk } (\text{Total}) = \$16.5 + \$16.5 - \$30.4 = \$2.6$$

The above calculation of risk is an approximation of risk, using a parametric method, as is known to those skilled in the art. Alternatively, Monte Carlo simulation can be used for a more accurate calculation of risk, as would be known to one of skill in the art, as informed by the present disclosure.

Figure 9:
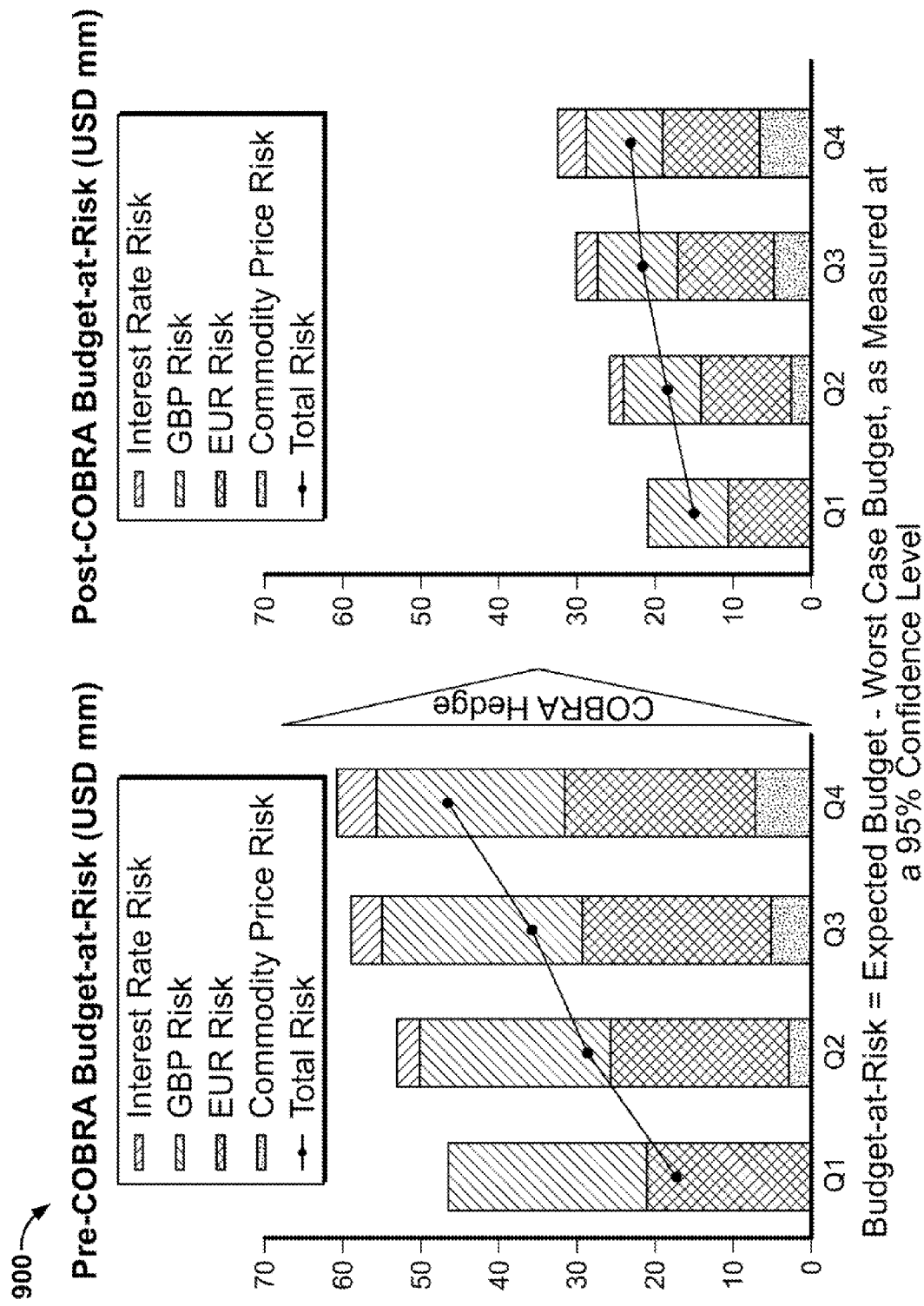
FIG. 9 is an exemplary graphic illustrating the budget-at-risk before and after the implementation of a hedge, in accordance with an embodiment of the present invention.

Thus, by way of the example, a diversification benefit of $2.6 is achieved. FIG. 9 depicts the budget-at-risk 900 before implementation of a hedge and after the implementation of a hedge, in accordance with embodiments of the invention. By way of embodiments of the invention, the risks to the budget relative to expected performance can be evaluated, and the performance of and results of hedging the risks in various manners can be measured. As used herein, the budget-at-risk equals the expected budget minus the worst-case scenario budget, as measured at a ninety-five percent confidence level, as described above with reference to FIG. 8. Thus, by way of some embodiments, the budget-at-risk can be assessed before any hedge, and then, as described in further detail below, a hedge can be defined that leads to a more balanced risk, with a lower total financial market risk achieved.

In use, embodiments of the invention can be used, by way of non-limiting example, by a treasury of a company to measure and manage the financial financial market risks in the treasury budgets over short-term horizons of one quarter and one year translated into a reported functional currency. In general, embodiments of the invention can be used to define the expected treasury budget under different assumptions for the underlying financial market variables, such as, for example, interest rates, foreign exchange rates, commodity prices, equity prices, as well as others, as are known to those skilled in the art. Embodiments can be used to measure the overall financial market risk to the treasury budget, incorporating the portfolio risk effect of the underlying market variables, as described above, and facilitate identification of appropriate hedging strategies for the collections of market variables in a less costly manner.

Figure 10:
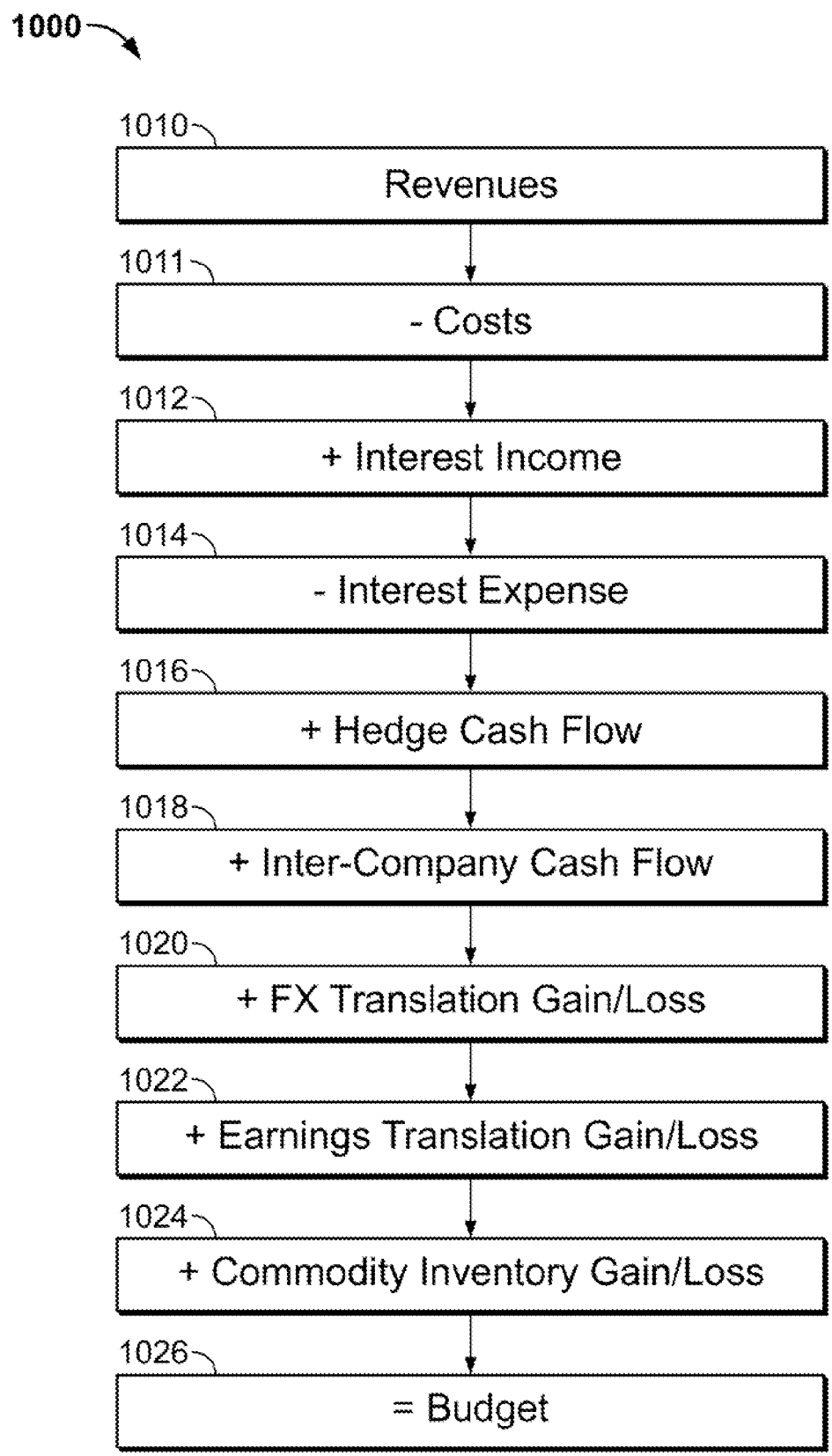
FIG. 10 is an exemplary schematic diagram illustrating financial elements of a treasury budget, in accordance with an embodiment of the present invention.

To achieve these goals, first, the components of a treasury budget must be identified. FIG. 10 depicts an example of financial elements of a treasury budget 1000, in accordance with embodiments of the invention. Beginning with revenues 1010 in each currency, costs 1011 in each currency are subtracted (resulting in gross profit), interest income 1012 is added and interest expense 1014 is subtracted. Hedge cash flow 1016 is then added, as is inter-company cash flow 1018 and foreign exchange (FX) translation gain or loss 1020. Earnings translation gain or loss 1022 and commodity inventory gain or loss 1024 are then added, resulting in a treasury budget 1026. As used in this example, revenues 1010 in each currency are included. Similarly, costs 1011 in each currency are used. Interest income 1012 includes interest received on investments and excess cash. Interest expense 1014 includes interest paid on liabilities. Hedge cash flow 1016 includes the financial impact of hedging. Inter-company cash flow 1018 includes inter-company dividends, service fees, royalties and interest cost. Foreign exchange (FX) translation gain/loss 1020 includes the gain or loss represented by the difference between the value at which an item is booked on a reporting date and the value at which it was previously booked, where this difference is caused by FX movements. The commodity inventory gain/loss 1024 includes the translation change in value of commodity inventory held on balance sheet.

Figure 11:
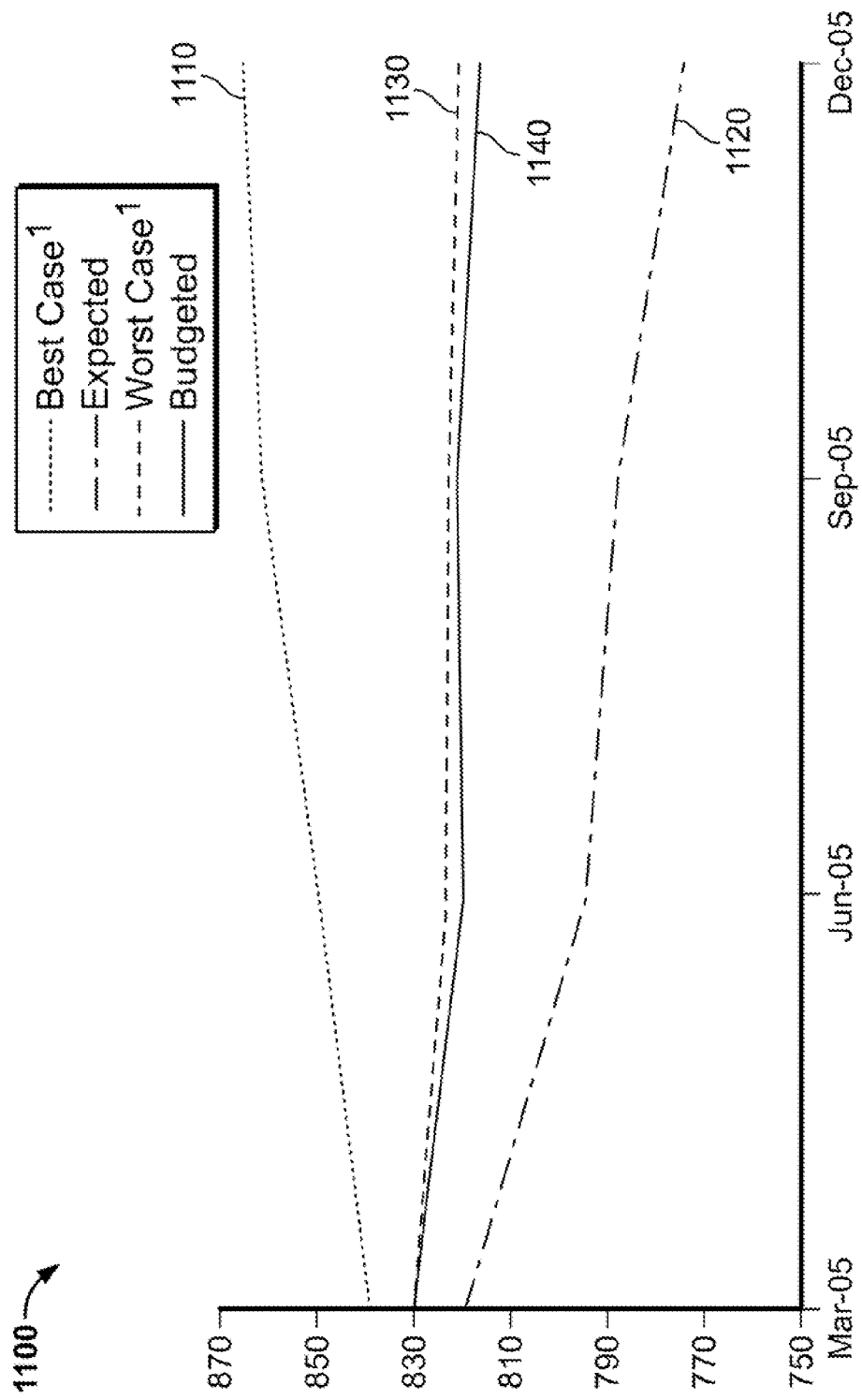
FIG. 11 is an exemplary graphic illustrating several risk levels for a total budget, in accordance with an embodiment of the present invention.

FIG. 11 depicts several financial market risk levels 1100 for a total budget, in accordance with embodiments of the invention. Budget financial market risk levels charted include a best case scenario 1110, worst case scenario 1120, expected results 1130 and budgeted expectations 1140. In some embodiments, at-risk scenarios can also be plotted for revenue-at-risk, interest income-at-risk, interest expense-at-risk, FX translation-at-risk, FX transaction-at-risk, commodity expense-at-risk, and/or dividends-at-risk, as well as other categories, as would be known to one of skill in the art, as informed by the present disclosure.

Figure 12:
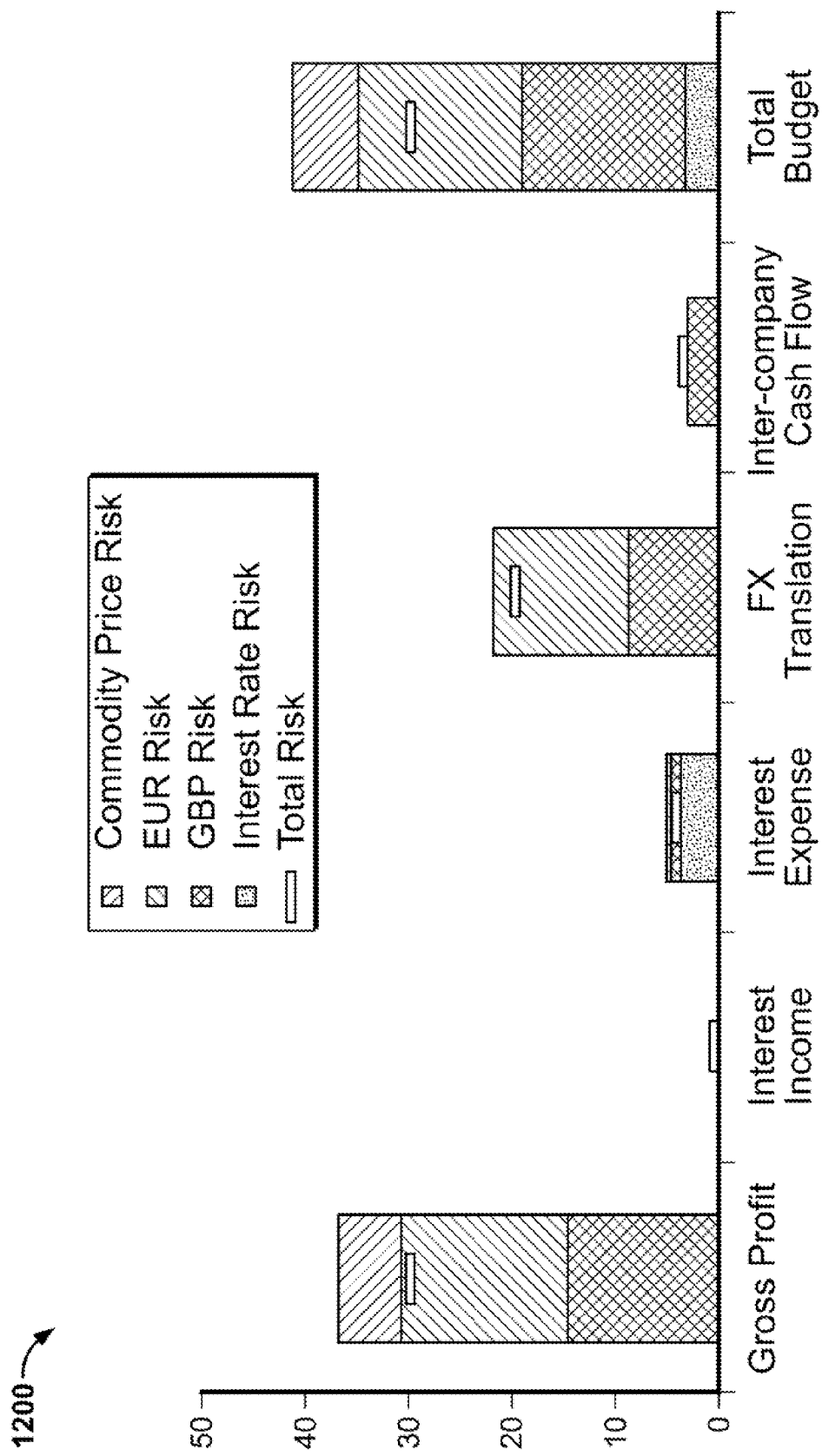
FIG. 12 is an exemplary graphic illustrating several risk levels for a total budget, viewing each risk on a standalone basis, in accordance with an embodiment of the present invention.

FIG. 12 depicts several financial market risk levels for a total budget 1200, viewing each financial market risk factor on a standalone basis, in accordance with embodiments of the invention. Budget categories can include one or more of revenues and costs (gross profit), interest income, interest expense, hedge cash flow, inter-company cash flow, foreign exchange translation gain or loss, earnings translation gain or loss and commodity inventory gain/loss, all of which can comprise the total budget. In this example, various categories of financial market risk, including interest rate financial market risk, European currency financial market risk, British Pound risk, commodity price risk and total risk are identified. Thus, the budget-at-risk which can be attributed to each risk factor is viewed on a standalone basis. For example, GBP risk can be analyzed by assuming all other risk factors evolve according to their expected path under each scenario. In some embodiments, all risk is assumed to be shown on a 95% confidence level. The total financial market risk in each case is often less than the sum of the individual risks due to diversification across risk factors.

Figure 13:
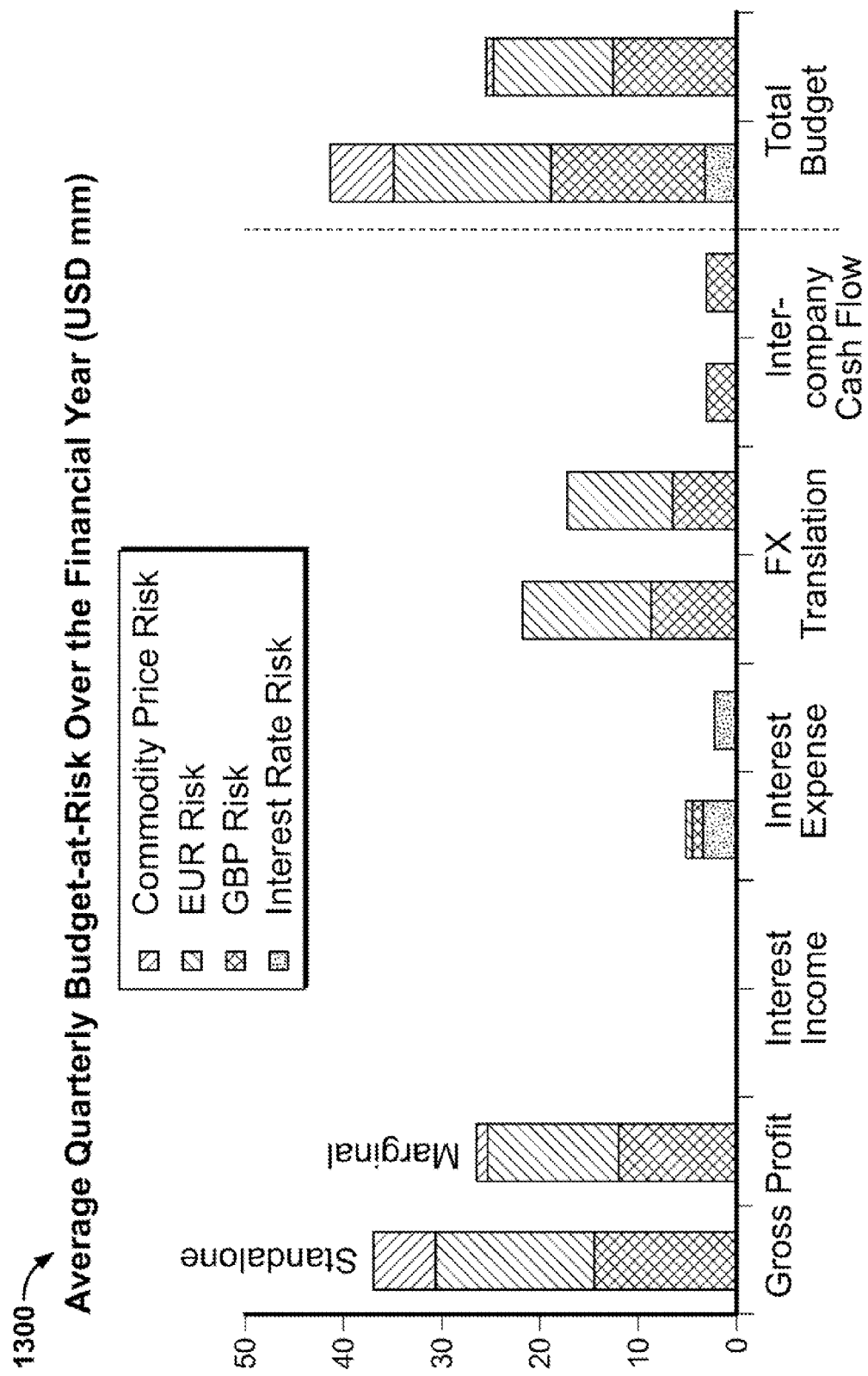
FIG. 13 is an exemplary graphic illustrating a comparison between standalone risk and marginal risk impact on a budget, in accordance with an embodiment of the present invention.

FIG. 13 depicts a comparison 1300 between standalone risk, as described above with respect to FIG. 12, and a marginal risk impact on a budget, in accordance with embodiments of the invention. As described above, the standalone risk represents the impact on each element of the budget when a risk is evaluated in isolation. The marginal risk represents the risk reduction from removing a single risk from the portfolio of risks. In some embodiments, marginal risk gives an indication of the benefit/risk reduction which can be achieved by hedging a single risk. A negative marginal exposure can indicate an exposure which is a hedge (i.e., removing this exposure increases overall risk).

Under certain circumstances, different types of hedges can be employed. Hedging with "forward-rate" hedges or forwards, for example, can be used to lock in FX rates and commodity prices at specific values. Hedging with "at-the-money option" hedges or vanilla options can be used to immunize against unfavorable FX rates and commodity prices. In addition, hedging with a "basket option" hedge can be used to remove downside financial market risk, but also allow some upside should FX rates and commodity prices improve. A "basket option" provides a hedge to the budget as a whole with respect to FX rates and commodity prices collectively rather than to each individually. The basket hedge has the advantage of being relatively less expensive and operationally simpler to implement than a portfolio of vanilla options.

Figure 14:
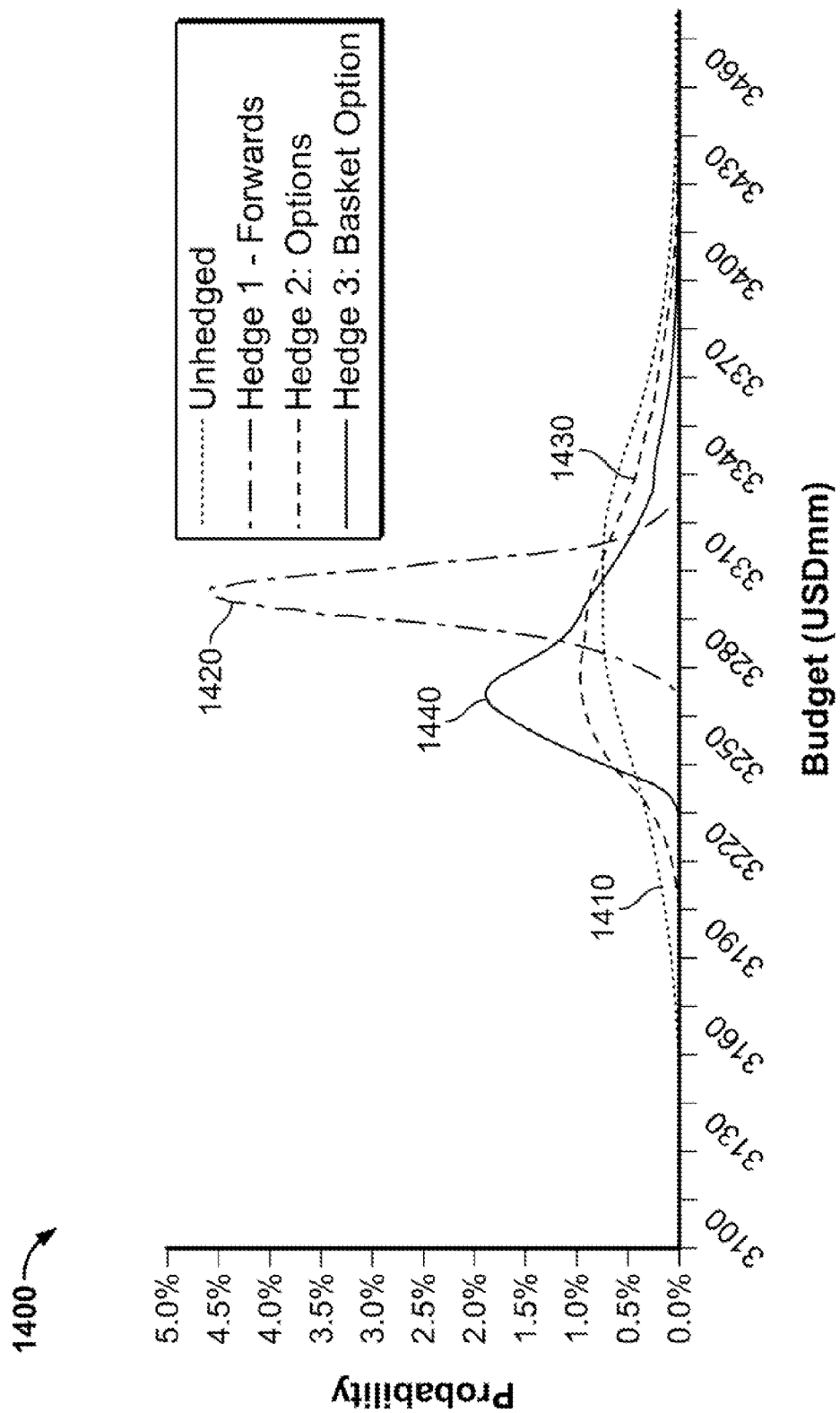
FIG. 14 is an exemplary graphic illustrating the impact of several option hedges on a budget, in accordance with an embodiment of the present invention.

FIG. 14 depicts the impact 1400 of several option hedges on a budget, in accordance with embodiments of the invention. The probabilities of various budget outcomes are forecast for several strategies, including an unhedged budget 1410, a first hedge strategy, employing forwards 1420, a second hedge strategy, employing vanilla options 1430, and a third hedge strategy, employing a basket hedge 1440.

In this example, the first hedge option 1420 employs zero-cost forwards for all budgeted FX and commodity exposures. The second hedge option 1430 employs individual at-the-money options for all budgeted FX and commodity exposures. The third hedge option 1440 employs a basket option for all budgeted FX and commodity exposures combined.

The basket option 1440 payoff in a quarter is equivalent to the aggregate payoff of the set of forwards considered in the first hedge option 1420, paid only when this total payoff is positive. In this scenario, if FX rates and commodity prices are collectively unfavorable (i.e., have a net negative budget impact) then the basket option 1440 provides a payoff to hedge, or neutralize, the impact. If FX rates and commodity prices are collectively favorable, then an improved budget result is delivered (i.e., an upside is gained). The basket hedge 1440 also provides a cost saving by avoiding over-hedging, and by allowing purchase at a lower option premium, as described above.

FIG. 15 depicts a screen shot showing a report 1500 including worst case and best-case scenario budget levels. Use of the report provides information regarding the relative success of implementation of a particular portfolio financial market risk management and hedging strategy.

In some embodiments, the steps of the methods can be performed by a software program operating on a computer having a processor and storage as would be known to those skilled in the art, as informed by the present disclosure. The computer can be one or more personal computers, and/or one or more servers, communicatively coupled via a network, such as an intranet, or the Internet. Alternatively, other computer configurations could be employed, as a matter of application specific design choice, as would be known to one skilled in the art, as informed by the present disclosure. In addition, the computer could be any now known, or later developed computing device, and/or handheld computing device, as would be known to one skilled in the art.

In certain embodiments of the invention, all of the steps of the method can be performed by a computer, or computing system, as described above. In alternative embodiments, one or more of the steps can be performed manually, by a person.

Thus, by way of embodiments of the invention, financial market risks to the overall budget are not overestimated, relatively less hedging is necessary, and the total hedging costs can be lowered.

It is to be understood that the exemplary embodiments are merely illustrative of the invention and that many variations of the above-described embodiments can be devised by one skilled in the art without departing from the scope of the invention. It is therefore intended that all such variations be included within the scope of the following claims and their equivalents.

What is claimed is:

1. A computerized method for managing a plurality of financial market risks to a budget, the computerized method comprising the steps of:
   defining, by a computer, an exposure map for the budget, wherein the exposure map includes a plurality of financial market risks;
   applying, by the computer, a first market scenario to the plurality of financial market risk factors to create an expected budget forecast;
   applying, by the computer, a second market scenario to the plurality of financial market risk factors to create a worse than expected budget forecast;
   calculating, by the computer, a portion of the budget at risk based on the difference between the expected budget forecast and the worse than expected budget forecast within a given confidence level, wherein the portion of the budget at risk corresponds to the risk associated with the plurality of financial market risks;
   employing, by the computer, a single hedge to mitigate the potential impact of the plurality of financial market risks to the portion of the budget at risk; and
   generating, by the computer, a financial risk analysis report.

2. The computerized method of claim 1, wherein the single hedge is a basket hedge.

3. The computerized method of claim 1, comprising the step of generating the first market scenario and the second market scenario.

4. The computerized method of claim 1, wherein defining the exposure map for the budget comprises defining exposure related to gross profit.

5. The computerized method of claim 1, wherein defining the exposure map for the budget comprises defining exposure related to one or more of current assets and current liabilities.

6. The method of claim 1, wherein defining the exposure map for the budget comprises defining exposure related to at least one of interest bearing liabilities and inter-company cash flow.

7. The computerized method of claim 1, wherein defining the exposure map for a treasury budget comprises defining exposure related budgeted levels for yields, rates and prices.

8. The method of claim 1, wherein the given confidence level is expressed as a percentage.

9. A system for managing a plurality of financial market risks, the system comprising:
   one or more storage devices, for storing financial information; and one or more processors, coupled to the storage devices, the processors programmed and configured to:
define an exposure map for the budget, wherein the exposure map includes a plurality of financial market risk factors,
apply a first market scenario to the plurality of financial market risk factors to create an expected budget forecast,
apply a second market scenario to the plurality of financial market risk factors to create a worse than expected budget forecast,
calculate a portion of the budget at risk based on difference between the expected budget forecast and the worse than expected budget forecast within a given confidence level, wherein the portion of the budget at risk corresponds to the risk associated with the plurality of financial market risks,
employ a single hedge to mitigate the potential impact of the plurality of financial market risks to the portion of the budget at risk; and
generate a financial risk analysis report.

10. The system of claim 9, wherein the single hedge is a basket hedge.

11. The system of claim 9, the processors being programmed and configured to generate the first market scenario and the second market scenario.

12. The system of claim 9, wherein defining the exposure map for the treasury budget comprises defining exposure related to gross profit.

13. The system of claim 9, wherein defining the exposure map for the treasury budget comprises defining exposure related to current assets and current liabilities.

14. The system of claim 9, wherein defining the exposure map for the treasury budget comprises defining exposure related to interest bearing liabilities and inter-company cashflows.

15. The system of claim 9, wherein defining the exposure map for the treasury budget comprises defining exposure related budgeted levels for yields, rates and prices.

16. The method of claim 9, wherein the given confidence level is expressed as a percentage.

* * * * *